(12) United States Patent
Cipolla

(10) Patent No.: US 10,040,148 B1
(45) Date of Patent: Aug. 7, 2018

(54) STONE SETTING MACHINE

(71) Applicant: Steven A. Cipolla, Warwick, RI (US)

(72) Inventor: Steven A. Cipolla, Warwick, RI (US)

(73) Assignee: National Chain Company, Warwick, RI (US)

( * ) Notice: Subject to any disclaimer, the term of this patent is extended or adjusted under 35 U.S.C. 154(b) by 339 days.

(21) Appl. No.: 15/006,414

(22) Filed: Jan. 26, 2016

(51) Int. Cl.
    *B23P 5/00* (2006.01)
    *A44C 17/04* (2006.01)

(52) U.S. Cl.
    CPC .............. *B23P 5/00* (2013.01); *A44C 17/043* (2013.01)

(58) Field of Classification Search
    CPC ........... Y10T 29/23; B23P 5/00; A44C 17/043
    See application file for complete search history.

(56) References Cited

U.S. PATENT DOCUMENTS

| | | | |
|---|---|---|---|
| 562,292 A * | 6/1896 | Field .................... | A44C 17/043 29/10 |
| 3,261,238 A | 7/1966 | Amerling | |
| 3,839,770 A * | 10/1974 | Favre .................... | A44C 17/043 29/10 |
| 3,960,307 A | 6/1976 | Doyel | |
| 4,329,890 A | 5/1982 | Ferstenberg | |
| 4,750,245 A | 6/1988 | Moussouris | |
| 6,959,624 B2 * | 11/2005 | Knuston .............. | G04D 1/0042 29/10 |
| 8,789,251 B2 | 7/2014 | Labow | |

\* cited by examiner

*Primary Examiner* — Richard Chang
(74) *Attorney, Agent, or Firm* — Salter & Michaelson

(57) ABSTRACT

A stone setting machine that includes a base structure having a centrally disposed holding aperture, and a holder for a pre-cast setting basket meant to receive a stone. The pre-cast setting basket includes a plurality of prongs meant to be bent to retain the stone. The holder is disposed within the holding aperture. A plurality of slide members are supported over the base structure and meant to bend the prongs. The base structure includes a stationary plate member. A rotatable disc is provided for support by the stationary plate member has a plurality of disc control slots corresponding in number to the number of slide members. A plurality of control pins are received in respective disc control slots and coupled to respective slide members. An actuation mechanism is for controlling the rotatable disc which, in turn, controls the slide members to bend a corresponding respective prong.

20 Claims, 18 Drawing Sheets

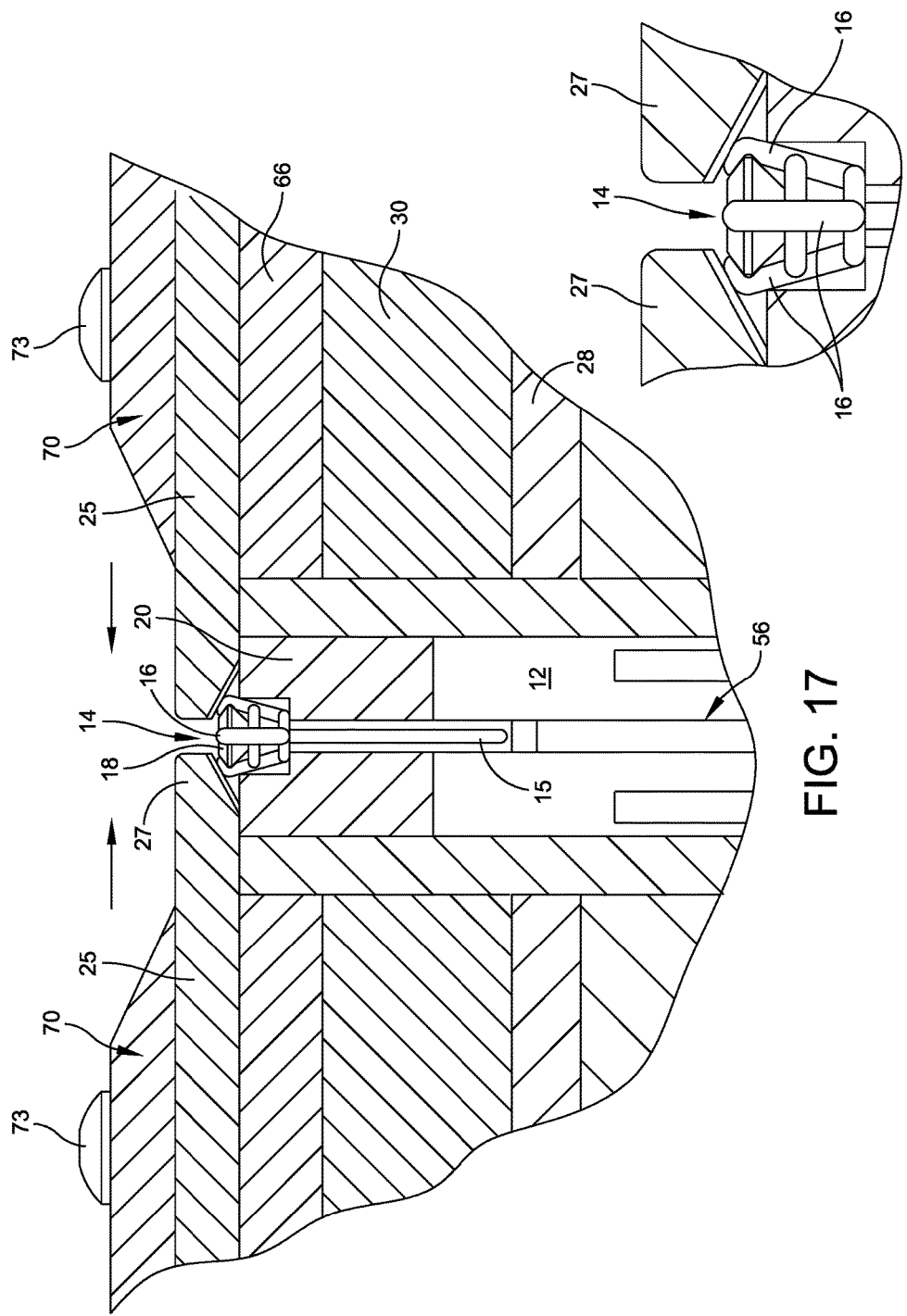

STONE SETTING MACHINE

FIELD OF THE INVENTION

The present invention relates in general to a machine for fabricating a setting for a stone or the like. More particularly, the present invention relates to an automated machine that provides a sliding mechanism for closing a plurality of prongs for attaching the stone to the setting.

BACKGROUND OF THE INVENTION

At the present time there does not exist an efficient machine for providing a setting for a stone or any other jewelry item. Many of the existing devices are hand operated and thus the entire process is rather tedious.

Accordingly, it is an object of the present invention to provide a stone setting machine in which there is provided a holder for a pre-cast basket setting and multiple slide members disposed radially and actuated to transition the slide members to close respective prongs of the pre-cast basket setting.

Another object of the present invention is to provide a stone setting machine in which the actuation of the slide members is preferably pneumatic.

A further object of the present invention is to provide a stone setting machine in which the actuation occurs with the simple depressing of one or more levers.

Still a further object of the present invention is to provide a stone setting machine having a unique ejection mechanism so that, once the setting is completed, it can be readily ejected from the machine.

SUMMARY OF THE INVENTION

To accomplish the foregoing and other objects, features and advantages of the present invention there is provided a stone setting machine comprising: a base structure having a centrally disposed holding aperture; and a holder for a pre-cast setting basket meant to receive a stone. The pre-cast setting basket includes a plurality of prongs meant to be bent to retain the stone. The holder is disposed within the holding aperture. A plurality of slide members are supported over the base structure and meant to bent the prongs. The base structure includes a stationary plate member. The machine further includes a rotatable disc having a plurality of disc control slots corresponding in number to the number of slide members. The rotatable disc is constructed and arranged for support by the stationary plate member. A plurality of control pins are received in respective disc control slots and coupled to respective slide members. An actuation mechanism is used for controlling the rotatable disc which, in turn, controls the slide members to bend a corresponding respective prong.

In accordance with other aspects of the present invention the slide members are all disposed to extend radially of the holding aperture; including a lever for ejecting the pre-cast setting basket; the actuation mechanism is comprised of a pneumatic mechanism and an actuation pad for selectively operating the pneumatic mechanism; including a clamp disposed between an adjacent set of slide members, said clamp for engaging and holding down the holder of the pre-cast setting basket; including a cap for each slide member for receiving the slide member and including a slot in the cap in which the slide member slides; the stationary plate member has a slot for receiving the control pin, and each control pin includes a pin base for riding in a control slot of the rotatable disc and a pin top that is secured to the slide member; each disc control slot is in the form of an arcuate slot and all of the disc control slots are spacedly disposed about a circumference of the rotatable disc; and each disc control slot has one end closer to a circumferential edge of the rotatable disc than an opposed end thereof so that as the rotatable disc is caused to rotate the respective control pin moves from a more proximal position to a more distal position so as to, in turn, move the slide member from a more proximal position to a more distal position to bend a respective prong.

In accordance with another version of the present invention there is provided a stone setting machine comprising: a base structure having a centrally disposed holding aperture; and a holder for a pre-cast setting basket meant to receive a stone. The pre-cast setting basket includes a plurality of prongs meant to be bent to retain the stone. The holder is disposed within the holding aperture. The machine also includes a plurality of slide members supported over the base structure and meant to bend said prongs. The base structure includes a stationary plate member. A rotatable disc is constructed and arranged for support by the stationary plate member; an inter-engageable pin and slot structure with one thereof associated with each prong to be bent. Each pin of the pin and slot structure is coupled to, and for control of, a respective slide member. An actuation mechanism is for controlling the rotatable disc which, in turn, controls the slide members to bend a corresponding respective prong.

In accordance with other aspects of the present invention the slide members are all dispose to extend radially of the holding aperture; including a lever for ejecting the pre-cast setting basket; the actuation mechanism is comprised of a pneumatic mechanism and an actuation pad for selectively operating the pneumatic mechanism; including a clamp disposed between an adjacent set of slide members, said clamp for engaging and holding down the holder of the pre-cast setting basket; including a cap for each slide member for receiving the slide member and including a slot in the cap in which the slide member slides; the stationary plate member has a slot for receiving the control pin, and each control pin includes a pin base for riding in a control slot of the rotatable disc and a pin top that is secured to the slide member; each disc control slot is in the form of an arcuate slot and all of the disc control slots are spacedly disposed about a circumference of the rotatable disc; and each disc control slot has one end closer to a circumferential edge of the rotatable disc than an opposed end thereof so that as the rotatable disc is caused to rotate the respective control pin moves from a more proximal position to a more distal position so as to, in turn, move the slide member from a more proximal position to a more distal position to bend a respective prong.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 17 is a fragmentary cross-sectional view with the slide members in the engaged position relative to the setting;

FIG. 18 is an enlarged fragmentary view directly at the setting;

DETAILED DESCRIPTION OF THE PREFERRED EMBODIMENTS

Figure 1:
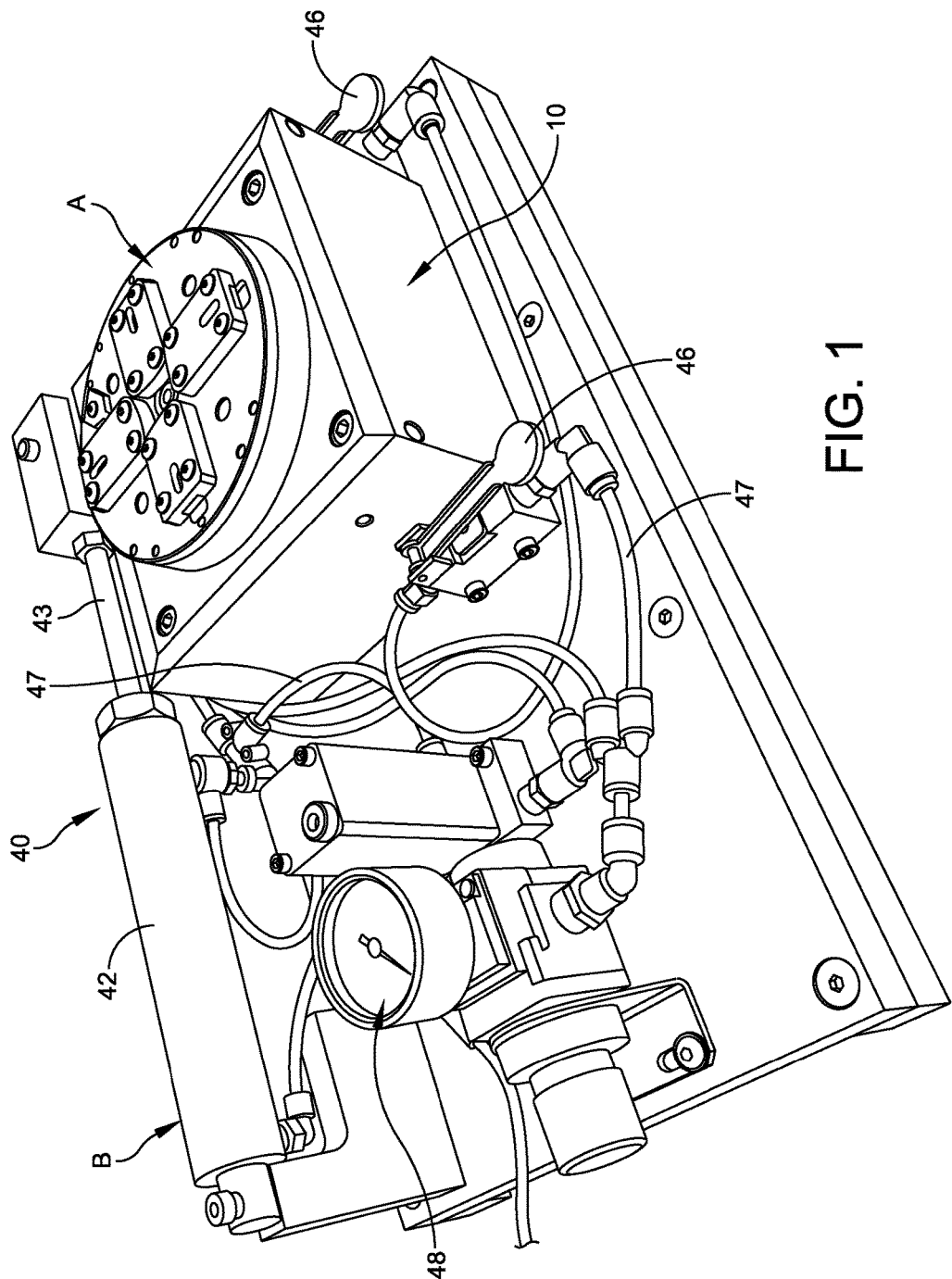
FIG. 1 is a perspective view of one embodiment of the stone setting machine of the present invention.
Figure 2:
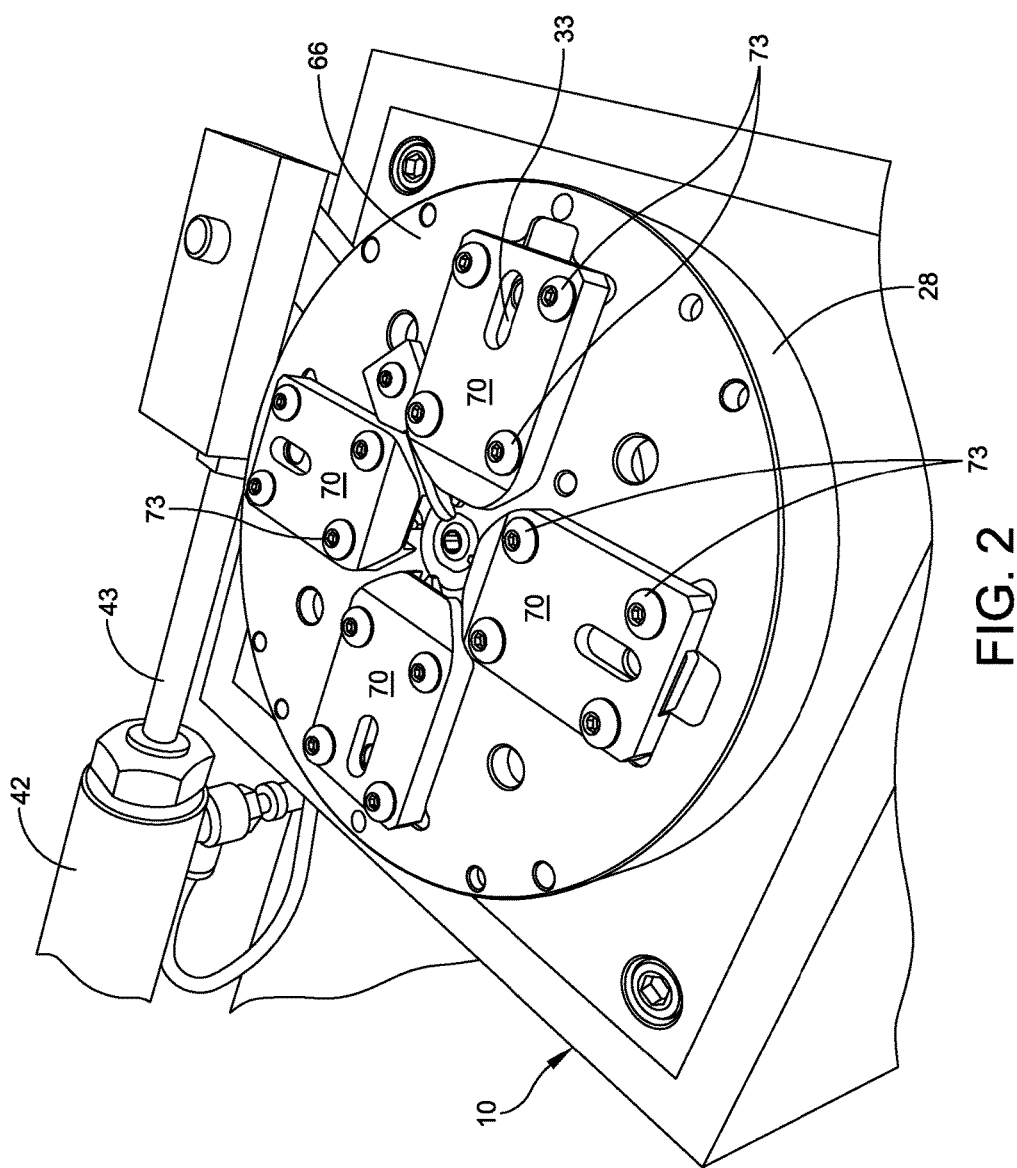
FIG. 2 is an enlarged perspective view of part of the machine shown in FIG. 1.

Reference is now made to the drawings of this application. The stone setting machine is comprised of a mechanism as illustrated in FIG. 1 that includes a base member for mounting various components including the pneumatic components as well as the basic fabrication station. The basic fabrication station in FIG. 1 is shown at A. On the other side of the machine, there is shown the pneumatics at B. The pneumatics include an actuation mechanism 40 that is comprised of an air cylinder 42 with an actuation rod 43. The actuation mechanism will be described in further detail hereinafter. FIG. 1 also illustrates several pneumatic lines 47 that interconnect with the air cylinder 42 and a gauge 48 for observing the air pressure being applied. The basic pneumatic arrangement may be considered as of conventional design, but unique as to its use in accordance with the present invention. FIG. 1 also illustrates a pair of levers or buttons 46 that may be actuated to engage the air cylinder 42 via the various pneumatic lines 47. Although two levers or buttons 46 are illustrated, it is understood that the actuation of the air cylinder may also be accomplished with a single lever or button.

Figure 4:
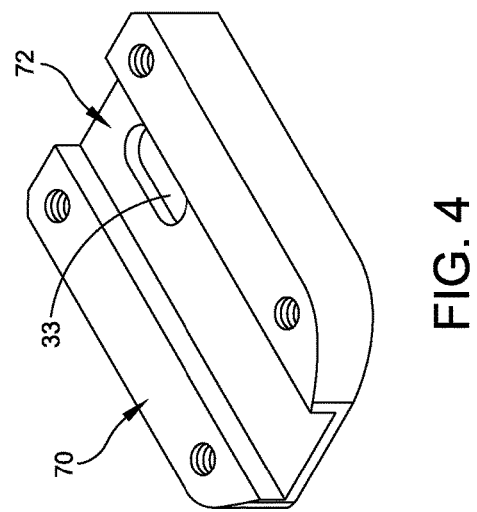
FIG. 4 is a perspective view of the cap in an inverted position.
Figure 5:
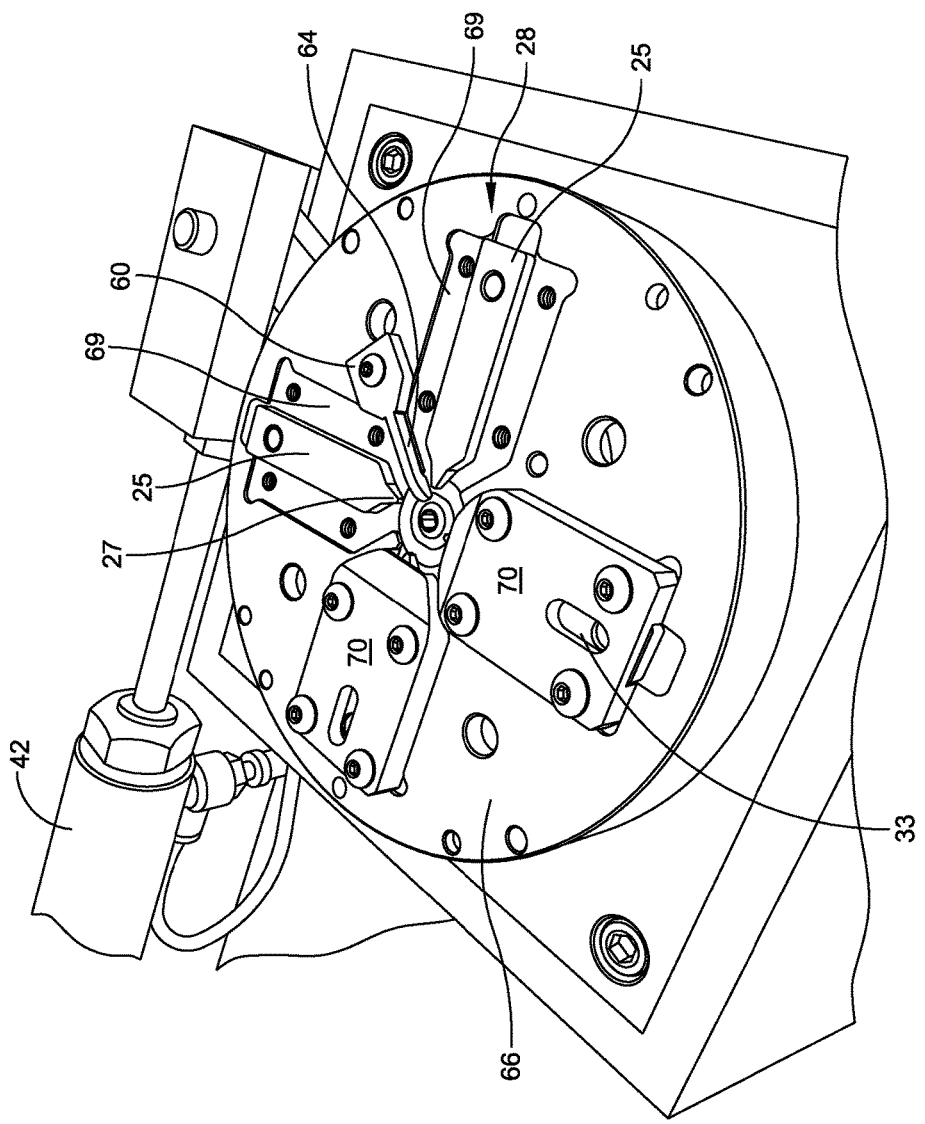
FIG. 5 is a perspective view similar to that shown in FIG. 2 but with two of the caps removed to illustrate the respective slide members.
Figure 6:
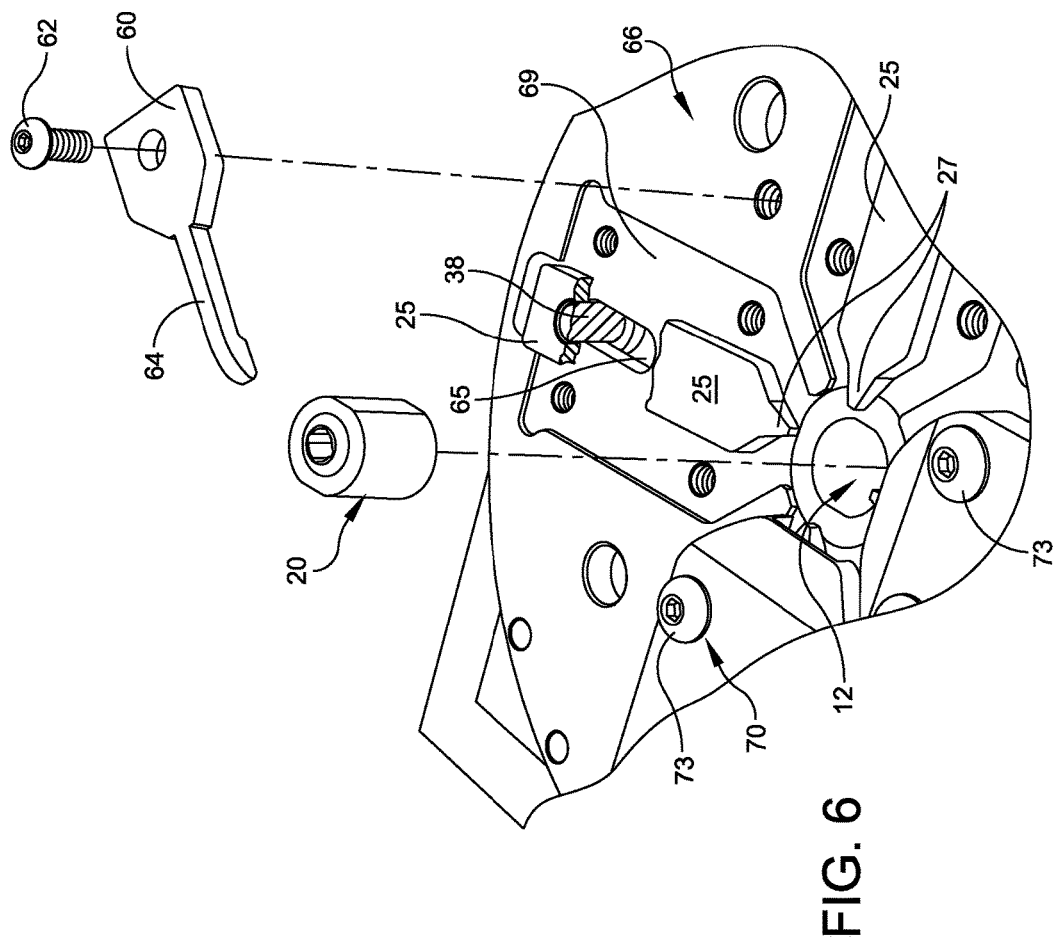
FIG. 6 is an enlarged fragmentary perspective view that also illustrates the clamp for the holder and is partially cut-away to show the plate slot.
Figure 7:
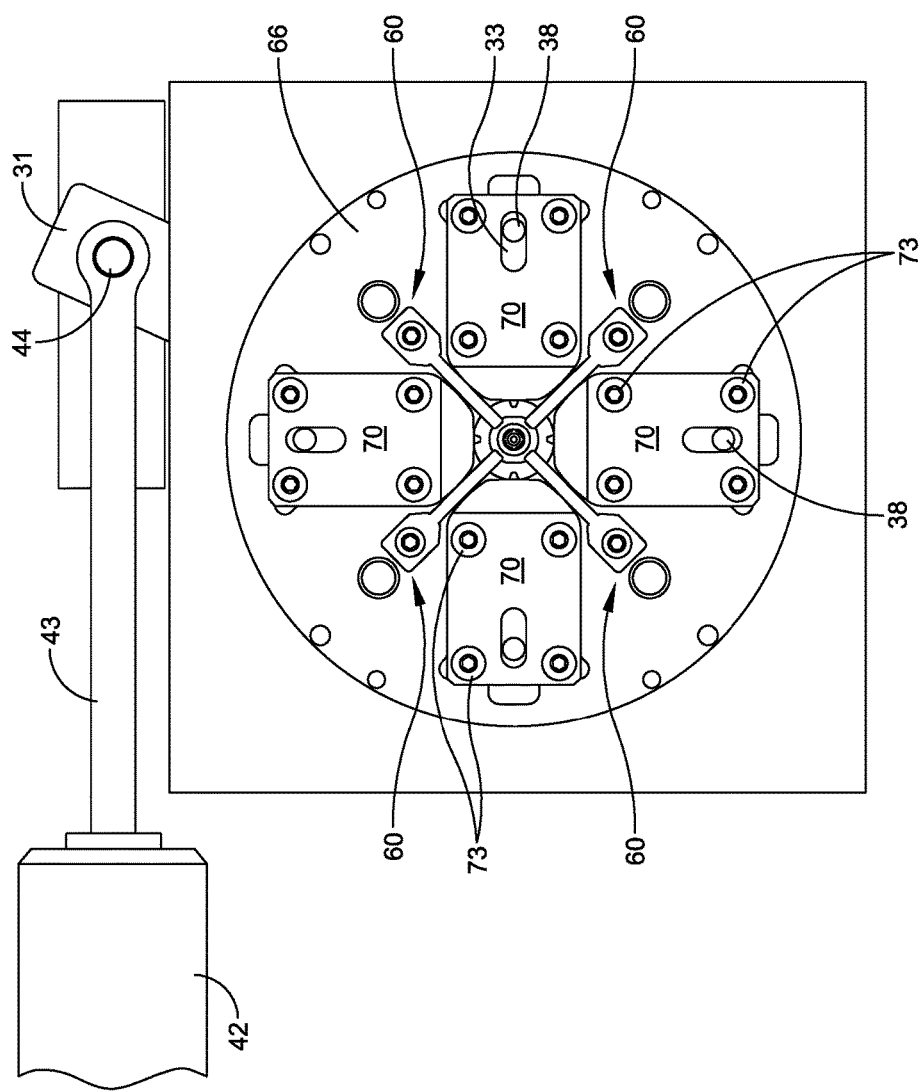
FIG. 7 is a plan view of an embodiment of the invention in which multiple clamps are provided.

With regard to the drawings and all of FIGS. 2-19, the stone setting machine is comprised of a base structure 10. This base structure 10 has a centrally disposed holding aperture 12. This holding aperture 12 is illustrated, for example, in the fragmentary perspective view of FIG. 6 at 12, or in the fragmentary cross-sectional view of FIG. 11 wherein the holder 20 is illustrated as set into the holding aperture 12. This aperture 12 is for receiving the holder 20. In this regard the holder 12 is preferably provided with side flat surfaces, such as shown in FIG. 6, and corresponding to flat surfaces within the holding aperture 12, in order to properly align the setting 14 and its prongs 16 with the respective slide members.

Figure 9:
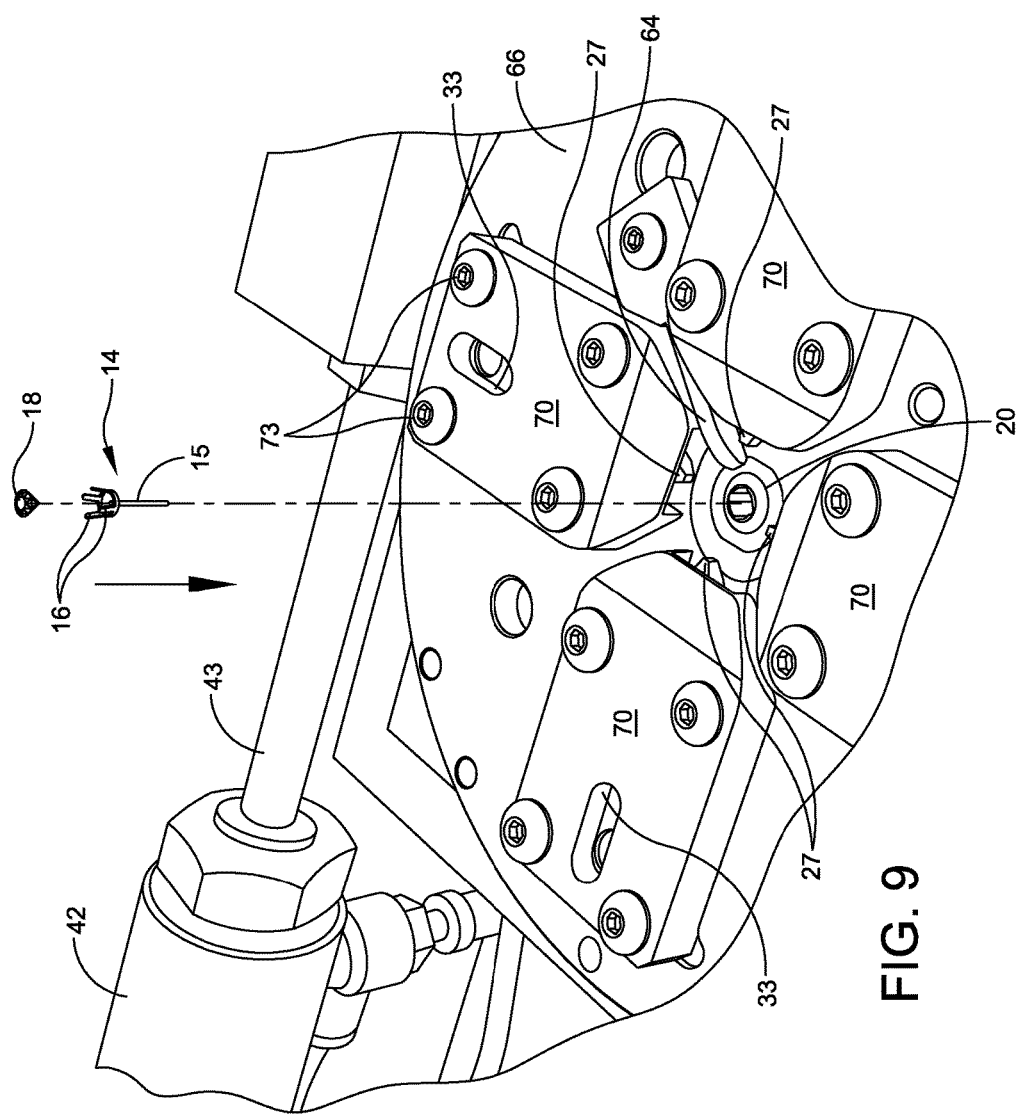
FIG. 9 is a fragmentary perspective view illustrating all of the caps in position, as well as the clamp and with the pre-cast basket exploded away from its holder.
Figure 10:
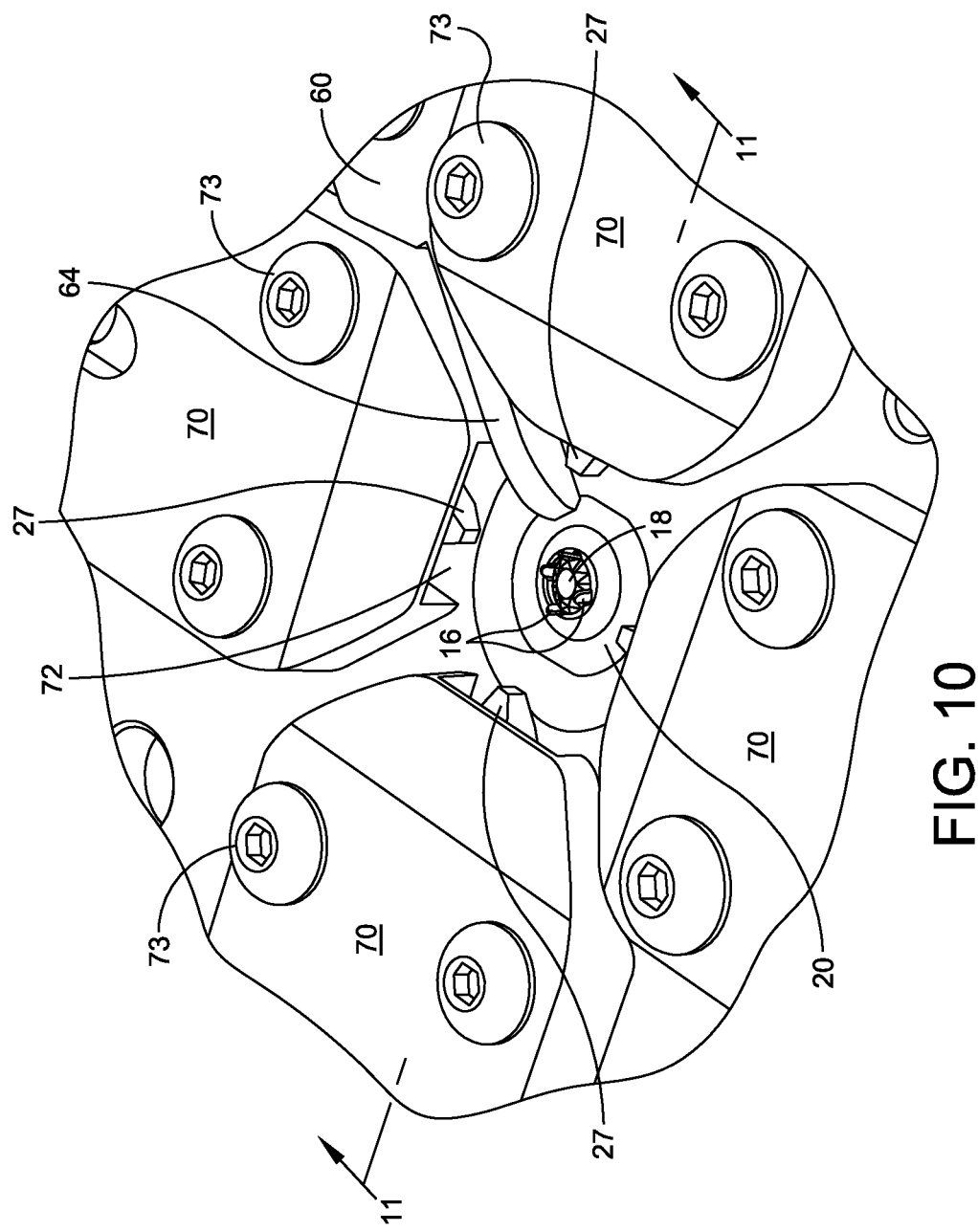
FIG. 10 is a fragmentary perspective view similar to that shown in FIG. 9 but with the basket and stone exposed in the holder.
Figure 11:
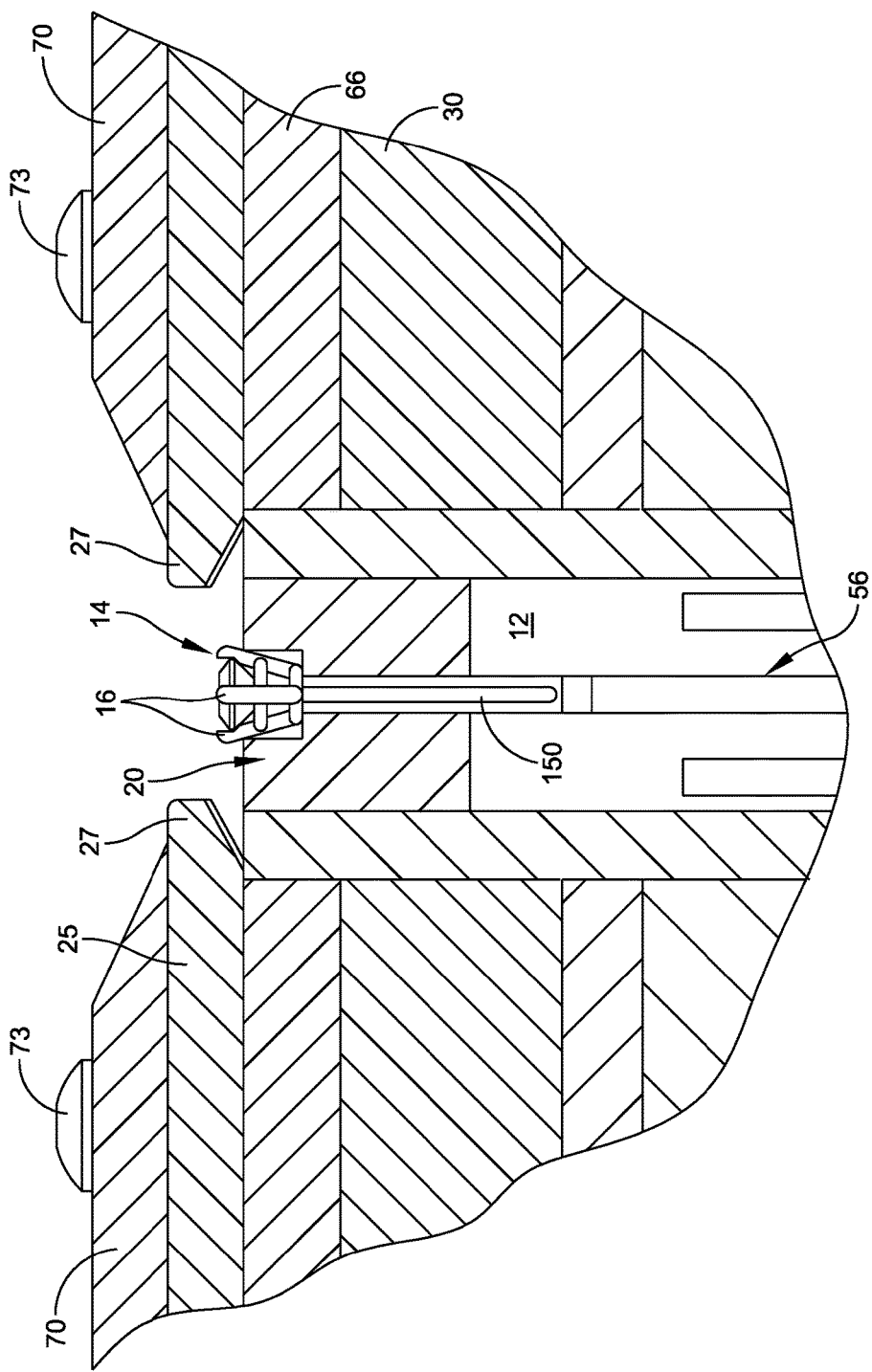
FIG. 11 is a cross-sectional view taken along line 11-11 of FIG. 10.

Refer now also to FIG. 9 which shows the pre-cast setting basket 14 that is meant to hold the stone 18. In this particular construction the basket 14 has four prongs 16, but other basket arrangements may also be used having different prong arrangements, or different numbers of prongs. It is preferred to have a minimum of at least three spaced apart prongs in the setting in order to properly retain the stone. The pre-cast setting basket 14 includes a support post 15 at its lower end and, in the embodiment illustrated, four prongs 16 that are equally spaced as 90 degree intervals. In the description herein, a "stone" is referred to, however, it is understood that the pre-cast setting basket 14 can retain any type of a decorative item including, but not limited to, gems, jewelry pieces and virtually any other decorative item. FIG. 9 also shows the holder 20 in position within the aperture 12 but with the pre-cast setting basket 14 exploded away from the holder aperture 12. The perspective view of FIG. 10, as well as the cross-sectional view of FIG. 11 also clearly illustrates the pre-cast setting basket 14 in place within a stepped aperture in the holder 20. Refer in particular to FIG. 11 showing the step in the aperture 12 in which the main part of the pre-cast setting basket 14 is held.

Figure 3:
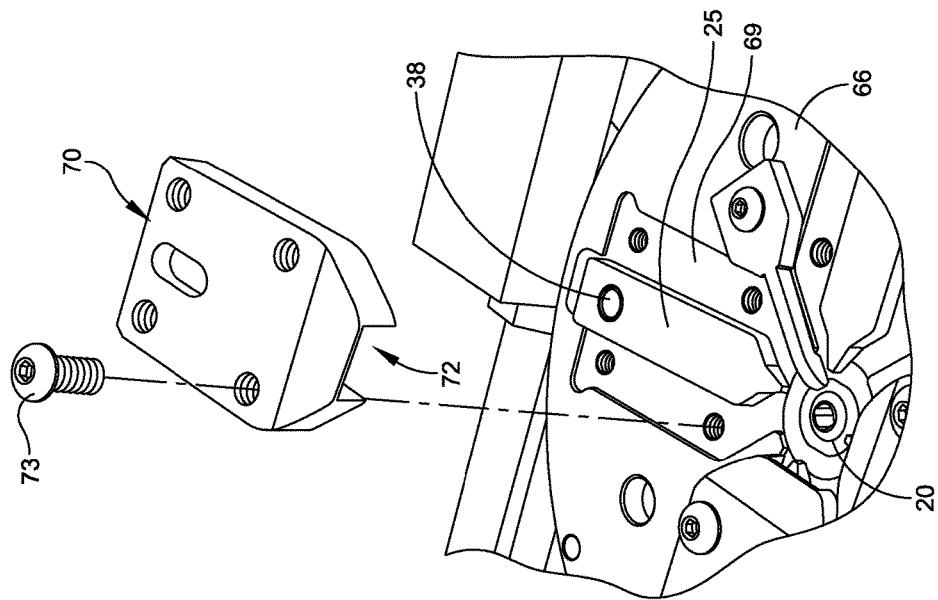
FIG. 3 is a fragmentary perspective view taken at the top plate member with the cap exploded away.

For the purpose of closing the prongs 16, there are provided a plurality of slide members 25. In FIGS. 3 and 5, the overlying caps 70 have been removed so that two of the slide members 25 are shown in FIG. 5. Each slide member 25 also is provided with a distal tip 27 that is adapted to engage the prong such as shown in the fragmentary cross-sectional view in FIGS. 17 and 18. Each slide member 25 is adapted for linear sliding in a direction toward and away from the aligned prong, and for that purpose the cap 70 is provided with a slot 72 (refer to FIGS. 3 and 4) as will be described in more detail hereinafter.

Figure 8:
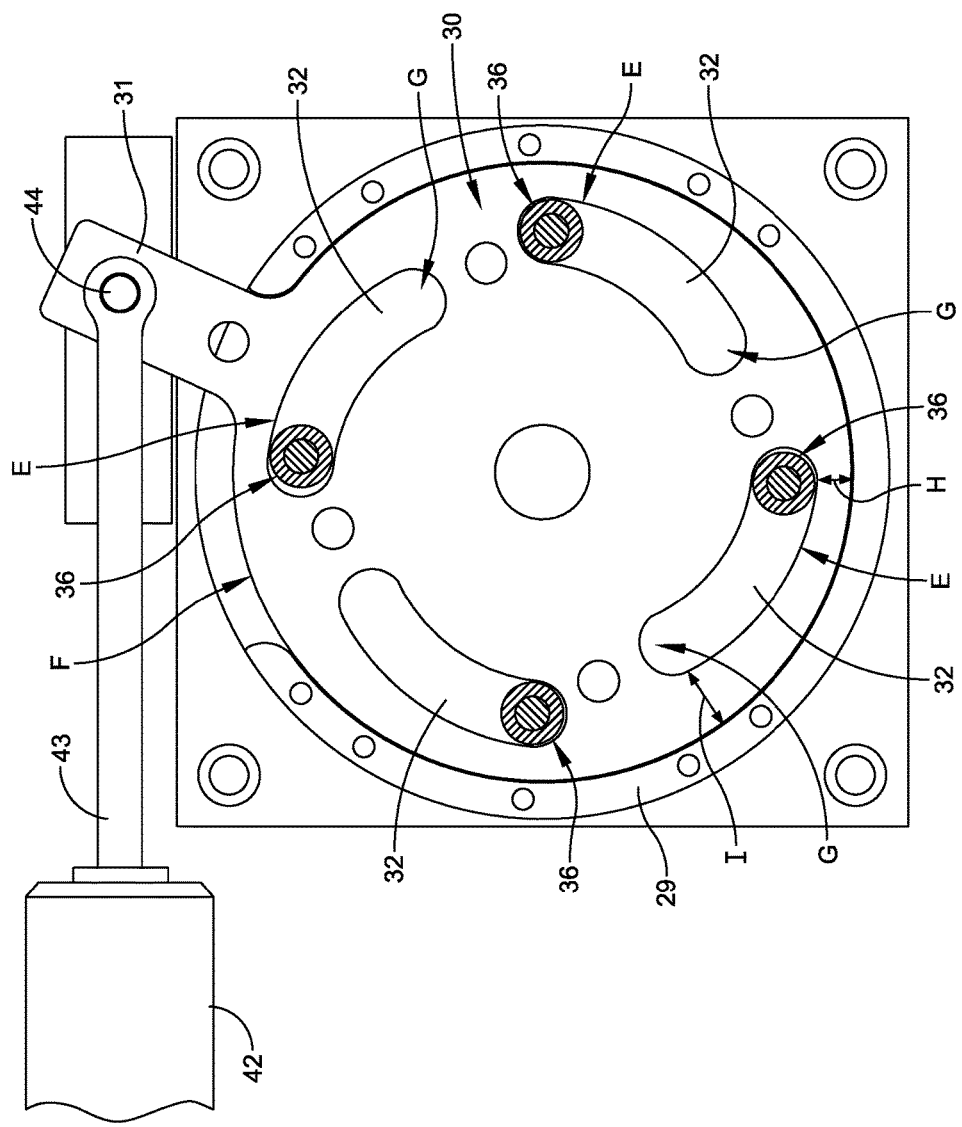
FIG. 8 is a plan view of the rotatable disc and slot arrangement that is instrumental in actuating the slide members concurrently, and in an initial at rest position.
Figure 12:
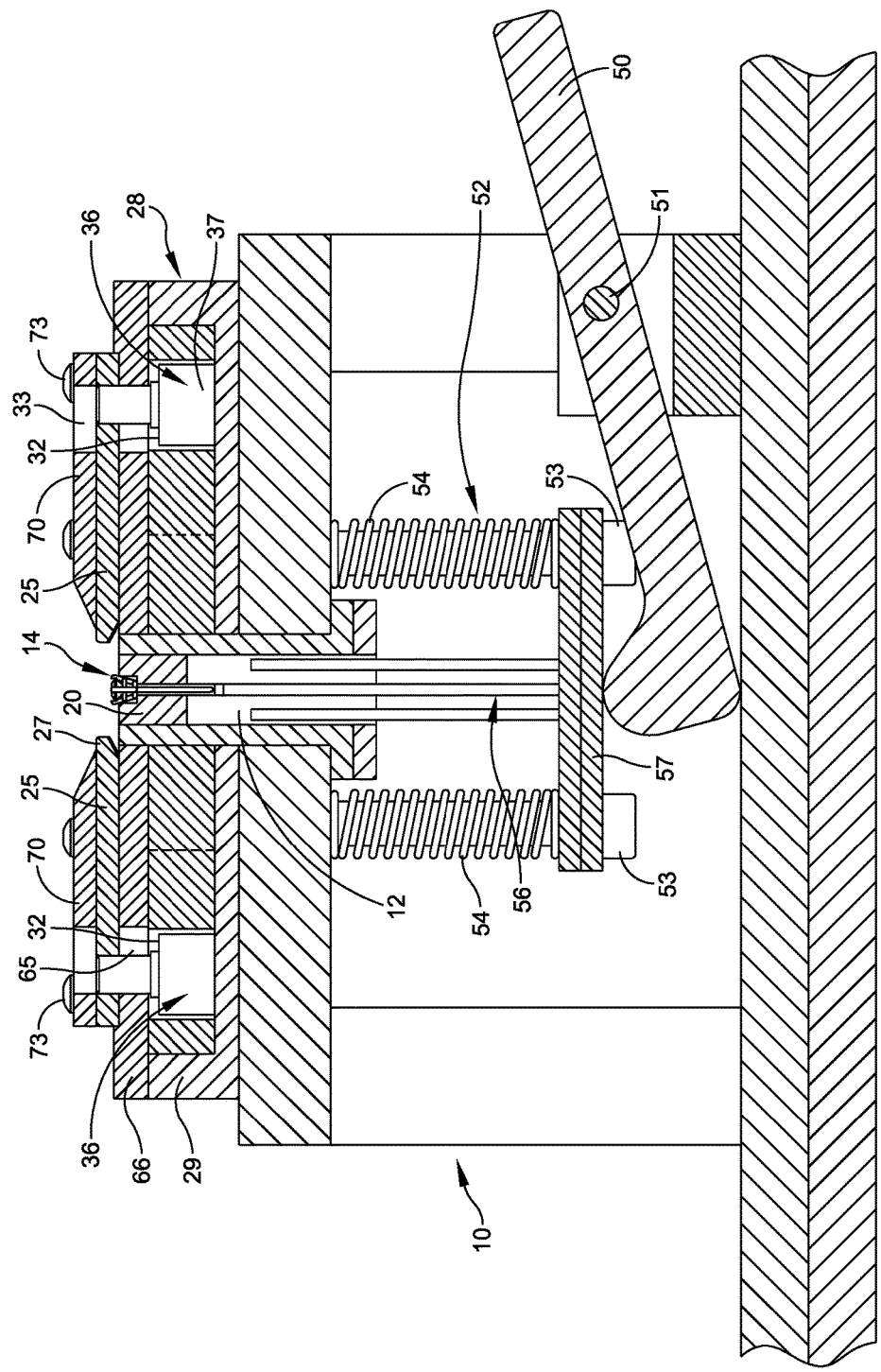
FIG. 12 is a cross-sectional view taken through the machine of the present invention in the initial position and also illustrating the ejection mechanism.
Figure 13:
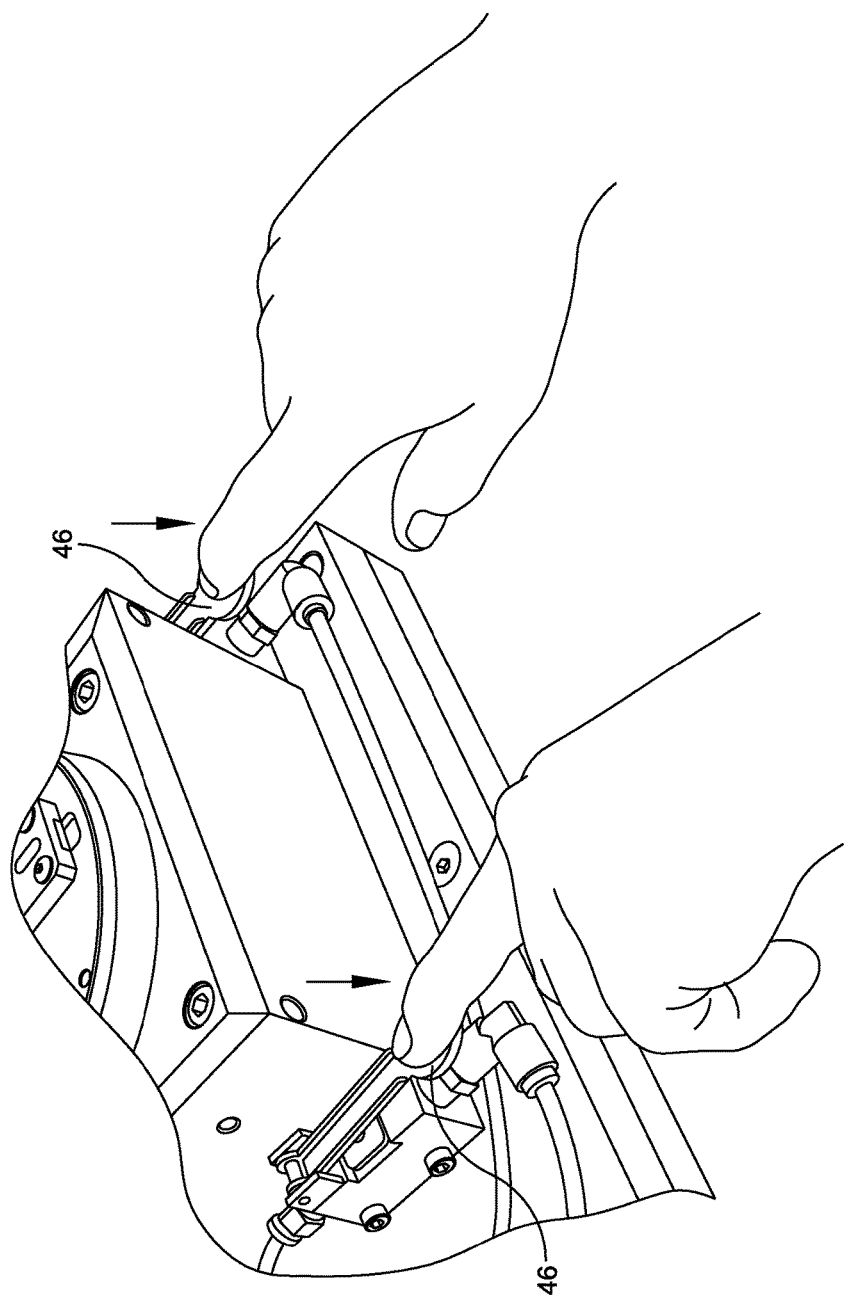
FIG. 13 schematically illustrates the actuation of the pneumatic system.
Figure 14:
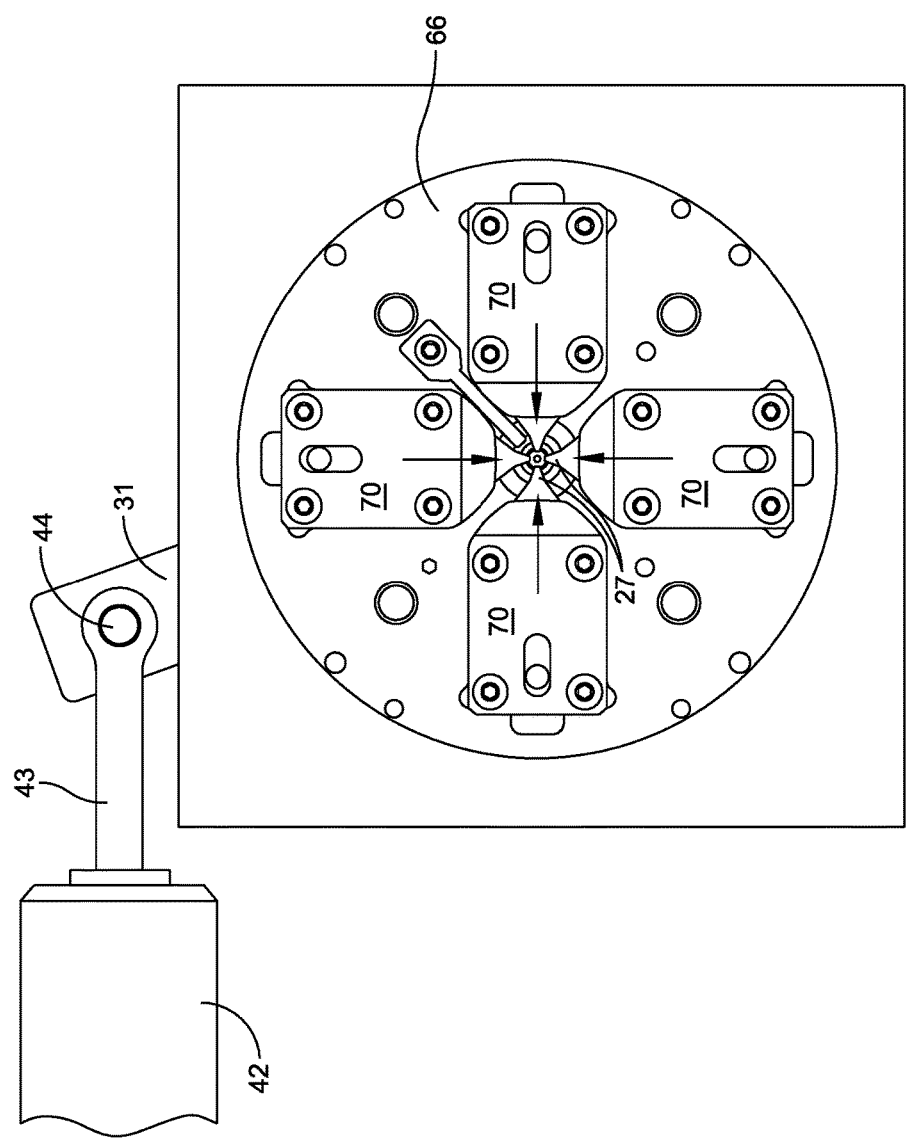
FIG. 14 is a plan view with the actuation mechanism being operated so that the slide members engage respective prongs.

The base structure 10 includes a stationary plate member 28. The periphery of the plate member 28 is shown in FIG. 8 for holding the rotatable disc 30. This forms a peripheral wall 29 in which the rotatable disc 30 sits. Refer also to the cross-sectional view in FIG. 12 showing the opposed position slide members 25, the caps 70, pins 36 and rotatable disc 30. In FIG. 12 the slide members are in a retracted position (spaced away from the basket prongs 16). The control of each of the slide members 25 is by means of a corresponding pin 36 that is disposed in a respective slot 32 in the rotatable disc 30, and that has a base 37 and top end 38, to be described hereinafter. It is the top end 38 that is secured with the slide member 25.

Referring now to FIG. 8, there is shown the rotatable disc 30 having four arcuate slots 32. In FIG. 8 four slots are used in that four prongs appear at the pre-cast setting basket. If the basket 14 had, for example, three prongs then three slide members would be used disposed 120 degrees apart, along with a corresponding number of disc slots 32. Each disc control slot 32 is spaced with respect to an adjacent slot and is essentially disposed about a circumference of the rotatable disc, as clearly illustrated in FIG. 8. FIG. 8 also shows the corresponding pins 36 and their position within the corresponding slot 32. It is noted that the control disc has one end E of the slot closer to the circumferential edge F of the rotatable disc and an opposed end thereof at G which is further away from the circumferential edge F. Refer in FIG. 8 to the different dimensions H and I, wherein the dimension I is greater than the dimension H. In this way when the rotatable disc is caused to be rotated the respective control pin moves from a more proximal position to a more distal position so as to, in turn, move the slide member from a more proximal position to a more distal position to engage and thus bend a respective prong.

Figure 15:
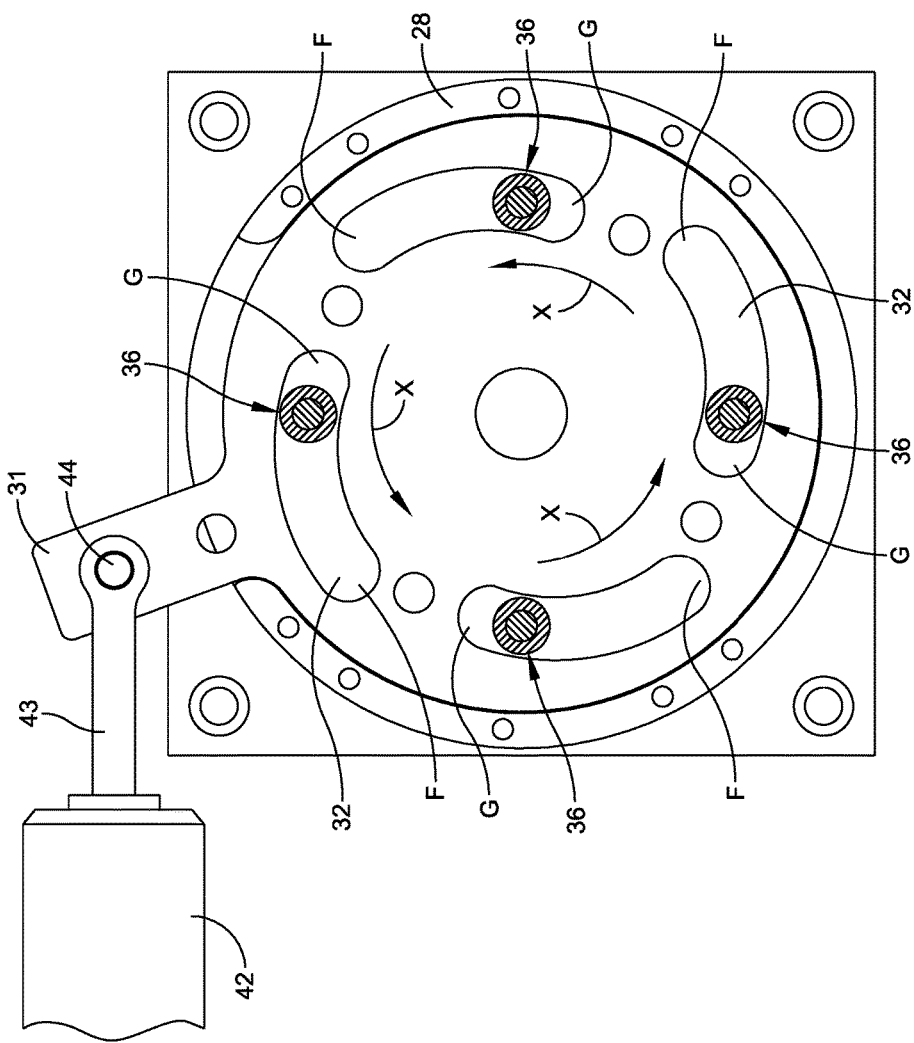
FIG. 15 is a plan view, similar to that shown in FIG. 8, with the top plate member removed and showing the rotatable disc having been rotated by means of the pneumatic actuation in the direction X to a position where the slide members engaged the prongs.
Figure 16:
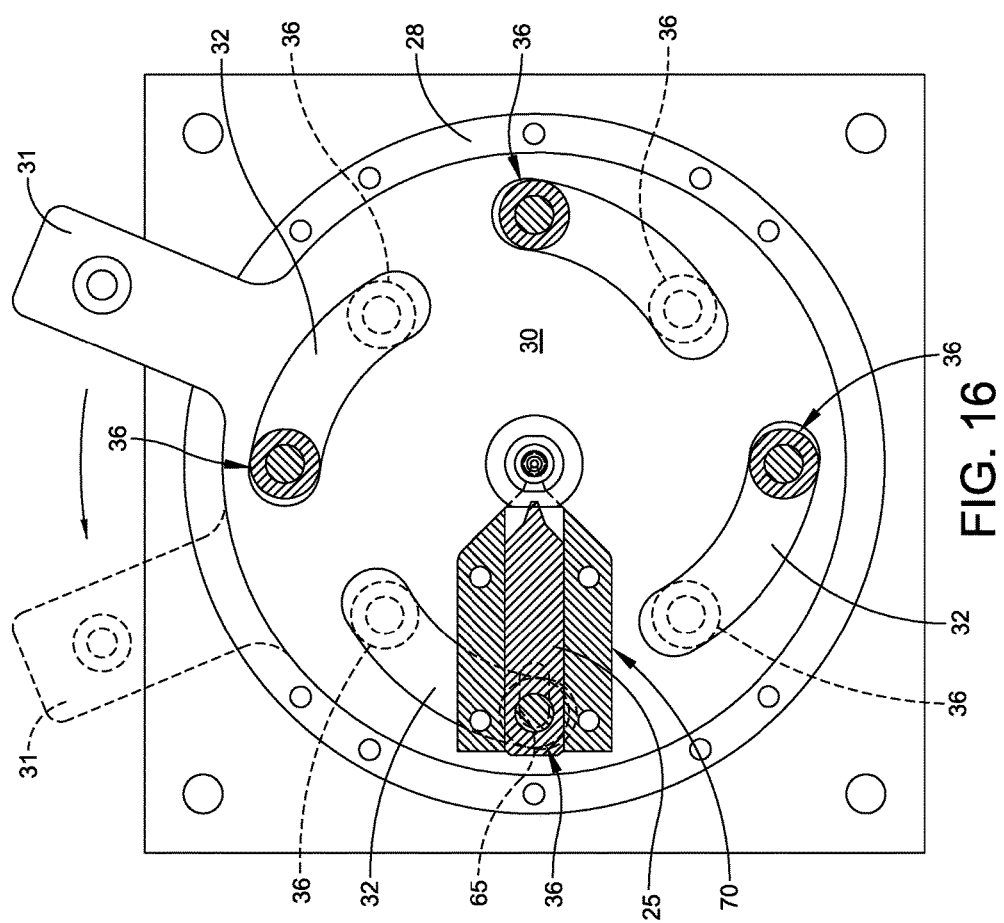
FIG. 16 is a plan view, similar to that shown in FIGS. 8 and 15, with the top plate member removed and showing the rotatable disc having been rotated between the alternate positions, and also showing the operation of the slide member.

With regard to the positions of the rotatable disc 30, refer to respective FIGS. 8 and 15. FIG. 8 illustrates a position of the rotatable disc as well as the position of the supported pin and accordingly the slide member 25. FIG. 15 illustrates by arrows X the rotation of the rotatable disc 30 to what might be considered an engaged position of the slide members 25. In that position the pins 36 are disposed further away from the circumferential edge of the rotatable disc 30 so that the slide members assume the position shown in FIG. 16 in dotted outline. In FIG. 16 the slide members is shown in solid outline corresponding to the withdrawn or retracted position of the slide members 25.

With reference to, for example, FIG. 12, this illustrates each of the pins 36. Each pin 36 includes a base 37 that is oriented within a corresponding slot 32 of the rotatable disc 30. Each pin 36 also includes a top 38 that is affixed to and engages the slide member 25. The top 38 could also extend into a slot 33 in the cap 70 to provide additional guidance of the slide member 25. In the cross-sectional view of FIG. 12, the rotatable disc 30 is in the position illustrated in FIG. 8 and thus the slide member 25 is in its retracted position. Reference may now be made to the cross-sectional view of FIG. 19 wherein the base of the pin 36 is disposed within the slot 32 in a more remote position from the edge of the rotatable disc so that each slide member is urged inwardly. Because all of the slots are arranged similarly this causes all of the slide members 25 to engage respective prongs 16 at the same time. The transition of the pin along the slot (controlled by rotation of the rotatable disc 30) essentially moves the slide member 25 toward the basket 14 and the corresponding basket prong 16, in order to engage and bend the prong.

As indicated previously, mounted on the machine is the air cylinder 42 which is actuated from one or more levers 46 for controlling the extension of the cylinder rod 43. As indicated previously, in the position viewed in FIG. 8 this is an extended position of the rod 43 corresponding to a withdrawn position of the slide members. On the other hand, FIG. 15 illustrates the position of the rod 43 in a withdrawn position so as to rotate the rotatable disc 30 to a position corresponding to a closing position against the prongs. The pins 36 always engage the corresponding slide member 25 with the rotatable disc 30 used to control the movement of the pin, as well as corresponding movement of the slide member 25, to perform the bending action.

Figure 19:
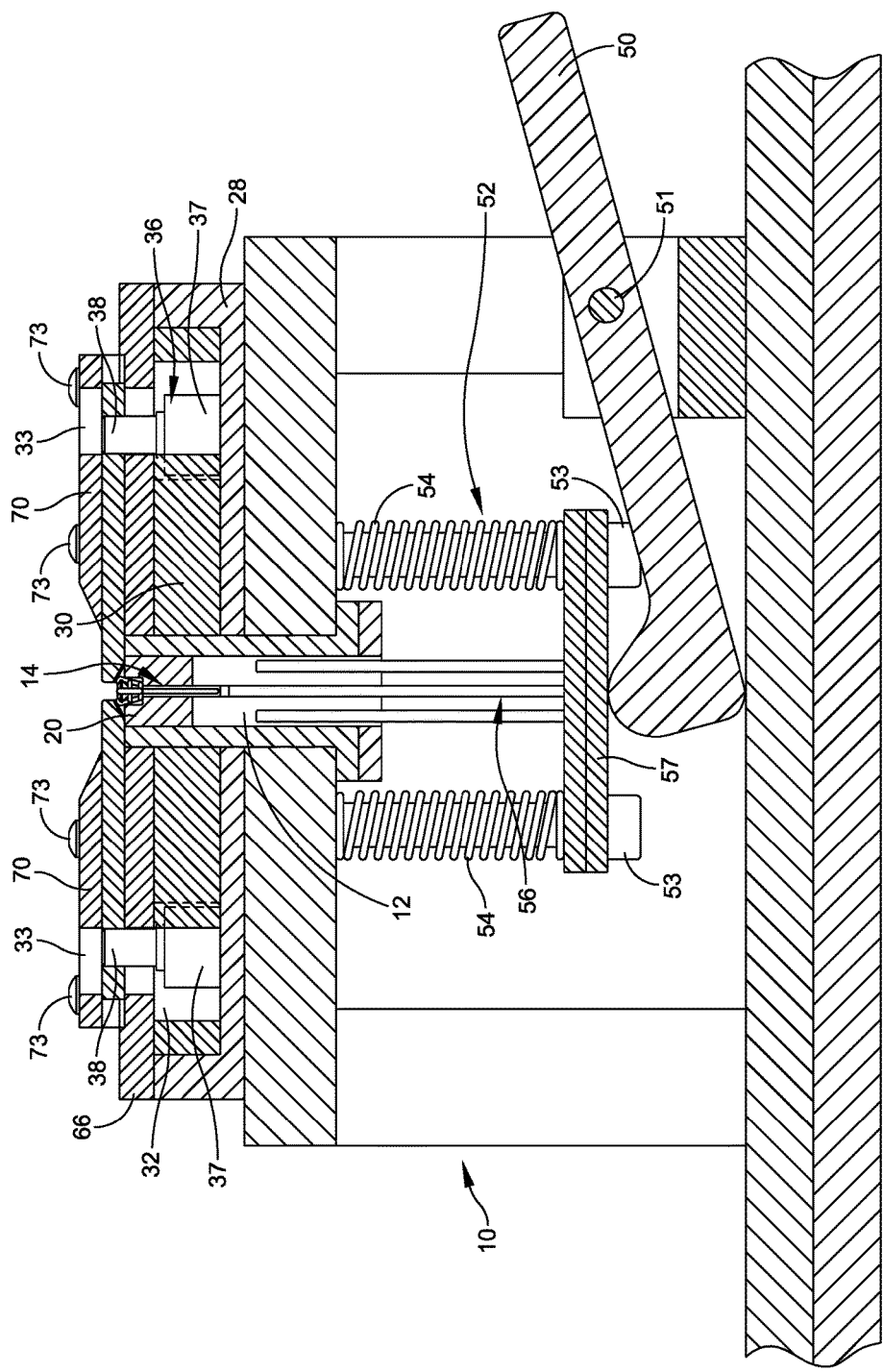
FIG. 19 is a cross-sectional view similar to that shown in FIG. 12 before the basket is ejected.
Figure 20:
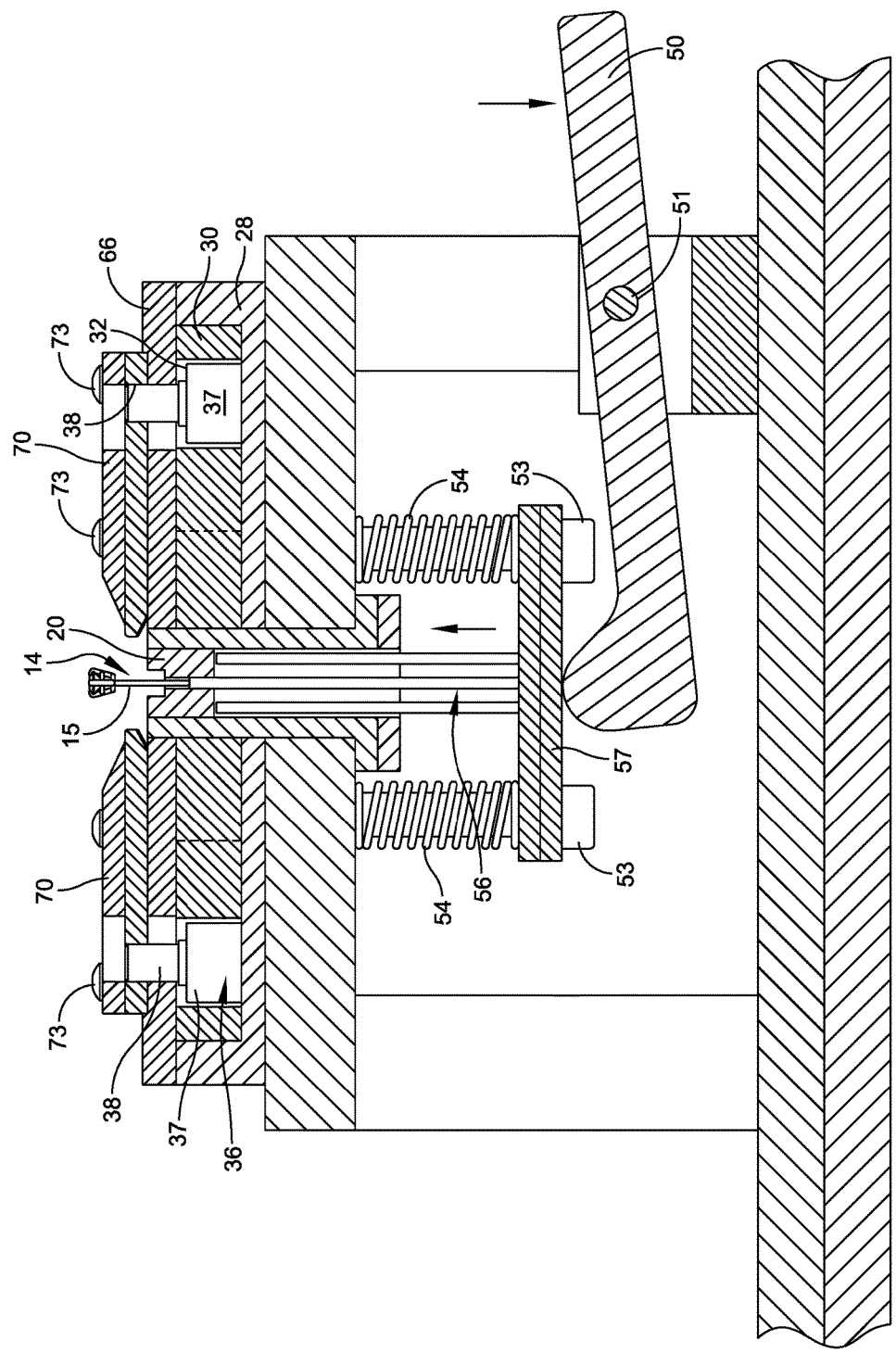
FIG. 20 is a cross-sectional view substantially the same as that shown in FIG. 19 with the basket being ejected from the holder.

One of the other main components of the machine of the present invention is the use of an ejection lever 50. This is illustrated, for example, in FIG. 12. The lever is disposed to the side of the base structure and is readily accessible to the user of the machine. FIG. 12 illustrates, in addition to the lever 50, an injection mechanism 52 that includes a pair of bolts 53, a support plate 57 and springs 54. The lever 50 is supported for pivoting at the pivot pin 51 from the machine frame. At the center of the plate 57, there is provided an ejection post 56 that is meant to engage and eject the pre-cast setting basket 14. In the cross-sectional view of FIG. 12, the ejection post 56 is arranged so that the top end of the post is close to but out of engagement with the post 15 of the basket 14. Reference to FIG. 19 illustrates the ejection lever 50 having been pivoted so as to move the plate 57 upwardly. This upward movement, against the compression of springs 54 causes the ejection post 56 to contact the post 15 of the basket 14. FIG. 20 thus illustrates the basket 15 being ejected from the holder 20 and thus readily removable by the operator of the machine.

With further reference to the ejection mechanism, it is illustrated in FIG. 12 in an "at rest" position prior to the lever 50 being manually activated. In that position the springs 54 expand the plate 57 to its lowermost position as illustrated in FIG. 12, but maintaining the plate or plates 57 in contact with the ejection lever 50. FIG. 19 shows the ejection mechanism in about the same position. FIG. 20 illustrates the pre-cast setting basket 14 being ejected from the holder 20 and thus readily removable by the operator of the machine. In FIG. 20 the lever 50 is shown as pivoting to move the plate 57 upwardly. As the ejection post 56 is supported from the plate 57, this action, in turn, causes the ejection post 56 to engage the lower end post of the pre-cast setting basket to move the setting basket at least partially out of the holder 20.

One of the other features of the present machine is the use of a clamp 60. In this regard, refer to the fragmentary view of FIG. 6 which illustrates the clamp 60 secured by a bolt 62 to the top plate 66. The top plate 66 covers the stationary plate 28. Refer to FIG. 12 from details of the stationary plate 28 and cover plate 66. The clamp 60 also includes a clamp arm 64 that is meant to engage a top surface of the holder 20 to hold the holder in place. In this regard, refer to FIG. 5 that shows the clamp 60 in place with the clamp arm 64 secured against a top surface of the holder 20. Refer also to FIG. 9 which shows the clamp arm 64 engaging a top surface of the holder 20. Reference may also be made to the plan view of FIG. 7 that actually shows the use of multiple holders 60 each one disposed between adjacent slide mechanisms.

Above each of the slide members 25 there is provided a cap 70. This cap is instrumental in providing a guide surface for each slide member 25. FIG. 3 illustrates the cap 70 exploded away from the plate 66. FIG. 4 illustrates the cap 70 in an inverted position to illustrate the recess or slot 72. It is the slot 72 that surrounds and guides the slide member 25. This guiding is in a radial direction so that the tip 27 of the slide member properly engages the corresponding prong 16. Reference may also be made to the fragmentary perspective view of FIG. 9 illustrating the cap 70 in place by means of a series of screws 73. FIG. 9 also illustrates the tip 27 of each slide member. In order for each slide member 25 to slide appropriately, the recess 69 in the plate 66 is provided with a somewhat elongated slot 65. This slot 65 enables the slide member 25 to have limited sliding action between a retracted and engaged position. Refer to the fragmentary view of FIG. 6, wherein a portion of the slide member 25 is cut-away, and for an illustration of the slot 65 within the plate recess 69. Refer also to the cross-sectional view of FIG. 12 which shows the slot 65 in the plate 66.

Having now described a limited number of embodiments of the present invention, it should now be apparent to those skilled in the art that numerous other embodiments and modifications thereof are contemplated as falling within the scope of the present invention, as defined by the appended claims. For example, in one embodiment illustrated herein an air cylinder is used, however, in another embodiment a different mechanism may be employed such as an electrical solenoid. In either case the rotatable disc is caused to be rotated so that the pins progress along the slots to different locations in order to extend the slide member to bend the prongs. Also, herein the apparatus that is used causes the slide members to be actuated concurrently, however, in another embodiment the actuation can be selectively in series or have one opposed set bent followed by having a second opposed set bent. In another alternate version, rather than having the slot or recess 72 for the slide member 25 being in the cap 70, a similar slot or recess can be provided within the plate 66 itself. I concept is to provide a guiding surface for the slide member 25 to that the slide member 25 is properly guided toward and away from the corresponding setting prong.

What is claimed is:

1. A stone setting machine comprising:
   a base structure having a centrally disposed holding aperture;
   a holder for a pre-cast setting basket meant to receive a stone;
   said pre-cast setting basket including a plurality of prongs meant to be bent to retain the stone;
   said holder disposed within the holding aperture;
   a plurality of slide members supported over the base structure and meant to bent said prongs;
   said base structure including a stationary plate member;
   a rotatable disc having a plurality of disc control slots corresponding in number to the number of slide members;
   said rotatable disc constructed and arranged for support by the stationary plate member;
   a plurality of control pins received in respective disc control slots and coupled to respective slide members;
   and an actuation mechanism for controlling the rotatable disc which, in turn, controls the slide members to bend a corresponding respective prong;
   further including a cap for each slide member for receiving the slide member and including an elongated slot in at least one of the cap and stationary plate member and in which the slide member is guided and slides.

2. The stone setting machine of claim 1 wherein said slide members are all disposed to extend radially of the holding aperture.

3. The stone setting machine of claim 1 including a lever for ejecting the pre-cast setting basket.

4. The stone setting machine of claim 1 wherein said actuation mechanism is comprised of a pneumatic mechanism and an actuation pad for selectively operating the pneumatic mechanism.

5. The stone setting machine of claim 1 including a clamp disposed between an adjacent set of slide members, said clamp for engaging and holding down the holder of the pre-cast setting basket.

6. The stone setting machine of claim 1 wherein the elongated slot is in the cap.

7. The stone setting machine of claim 1 wherein the rotatable disc has a control slot for receiving the control pin, and each control pin includes a pin base for riding in the control slot of the rotatable disc and a pin top that is secured to the slide member.

8. The stone setting machine of claim 7 wherein each disc control slot is in the form of an arcuate slot and all of the disc control slots are spacedly disposed about a circumference of the rotatable disc.

9. The stone setting machine of claim 8 wherein each disc control slot has one end closer to a circumferential edge of the rotatable disc than an opposed end thereof so that as the rotatable disc is caused to rotate the respective control pin moves from a more proximal position to a more distal position so as to, in turn, move the slide member from a more proximal position to a more distal position to bend a respective prong.

10. The stone setting machine of claim 9 further including a plurality of caps one disposed over and for each slide member for receiving the slide member and including a slot in the cap in which the slide member slides.

11. The stone setting machine of claim 10 wherein the stationary plate member has a peripheral wall into which the rotatable disc fits.

12. The stone setting machine of claim 1 wherein said holder is a single piece holder that is disposed at the centrally disposed holding aperture of the base structure.

13. The stone setting machine of claim 12 wherein the rotatable disc is planar having a flat surface and the rotatable disc further has a plurality of control slot for receiving respective control pins.

14. The stone setting machine of claim 1 wherein each control pin includes a pin base for riding in the control slot of the rotatable disc and a pin top that is secured into a hole at a proximal end of the slide member.

15. The stone setting machine of claim 14 wherein each cap also has a limited length slot that is disposed in the elongated slot and that receives the top of the pin.

16. The stone setting machine of claim 1 further including a planar cover plate that is disposed over the rotatable disc and that captures the plurality of control pins between the planar cover plate and the rotatable disc.

17. The stone setting machine of claim 16 wherein the planar cover plate has a plurality of radially disposed recesses that each accommodate a cap thereover, and a series of securing screws that hold the cap over each respective recess in the planar cover plate.

18. The stone setting machine of claim 17 wherein the planar cover plate also includes, in each recess, a cover plate slot that accommodates the top of the pin.

19. The stone setting machine of claim 1 wherein said holder is a single piece holder that is disposed at the centrally disposed holding aperture of the base structure, and further including a plurality of caps that are each separated from an adjacent cap and that are disposed radially of the single piece holder.

20. The stone setting machine of claim 19 wherein each cap also has a limited length slot that is disposed in the elongated slot and that receives the top of the pin.

\* \* \* \* \*